United States Patent [19]
Reid
[11] 3,971,718
[45] July 27, 1976

[54] HYDROCYCLONE SEPARATOR OR CLASSIFIER

[75] Inventor: Charles M Reid, Calgary, Canada
[73] Assignee: Elast-O-Cor Products & Engineering Limited, Calgary, Canada

[22] Filed: July 9, 1974
[21] Appl. No.: 487,209

[30] Foreign Application Priority Data
July 20, 1973 Canada .............................. 177018

[52] U.S. Cl. .............................. 210/84; 210/512 R; 209/144
[51] Int. Cl.[2] .............................. B01D 21/26
[58] Field of Search .............................. 55/52, 203, 204; 208/11; 209/144, 211; 210/84, 304, 311, 512 R, 512 M

[56] References Cited
UNITED STATES PATENTS

| | | | |
|---|---|---|---|
| 2,881,126 | 4/1959 | Glinka | 208/11 |
| 2,927,693 | 3/1960 | Freeman et al. | 209/211 |
| 3,010,579 | 11/1961 | Duesling | 209/211 |
| 3,331,193 | 7/1967 | Woodruff | 209/211 X |
| 3,337,050 | 8/1967 | Labecki | 209/211 |
| 3,399,770 | 9/1968 | Salomon | 210/512 R X |
| 3,513,642 | 5/1970 | Cornett | 210/512 R X |
| 3,800,946 | 4/1974 | Reid et al. | 210/512 R X |

FOREIGN PATENTS OR APPLICATIONS

| | | | |
|---|---|---|---|
| 667,712 | 7/1963 | Canada | 209/211 |

*Primary Examiner*—Charles N. Hart
*Assistant Examiner*—Robert H. Spitzer
*Attorney, Agent, or Firm*—Spencer & Kaye

[57] ABSTRACT

This relates to the separation of two or three constituent suspensions by means of hydrocyclone systems employing a primary vortex chamber and a secondary or "washing" cyclone. The underflow end of the primary vortex chamber is provided with spiral groove means defining a passage for the heavier fraction passing from the primary vortex chamber, such groove reducing interference between the heavier solids fraction passing into the washing cyclone and the opposing overflow stream passing from the washing cyclone into the primary and increasing the efficiency of the separation.

7 Claims, 10 Drawing Figures

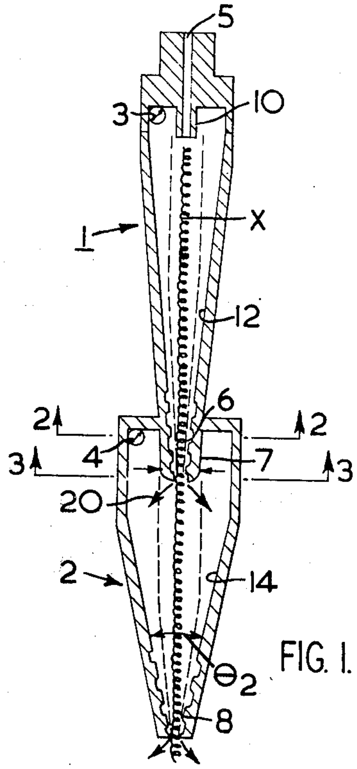
FIG. 1.
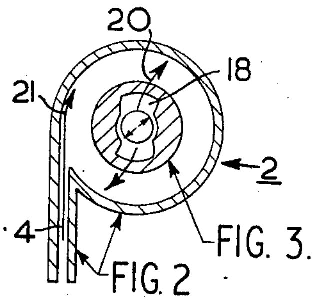
FIG. 2
FIG. 3.

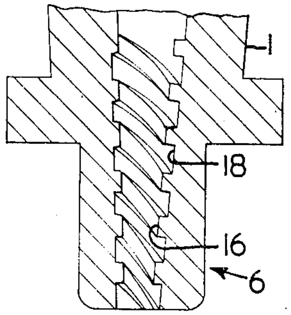
FIG. 5.
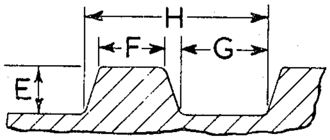
FIG. 7.
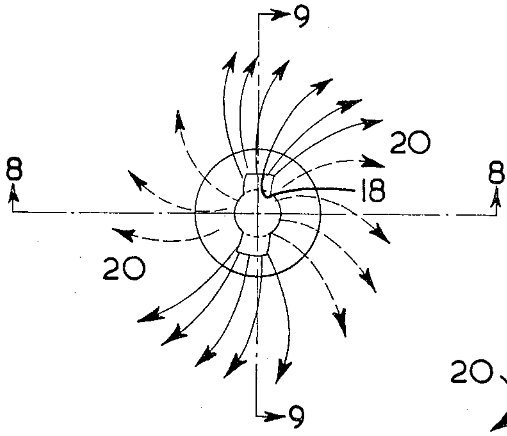
FIG. 6.
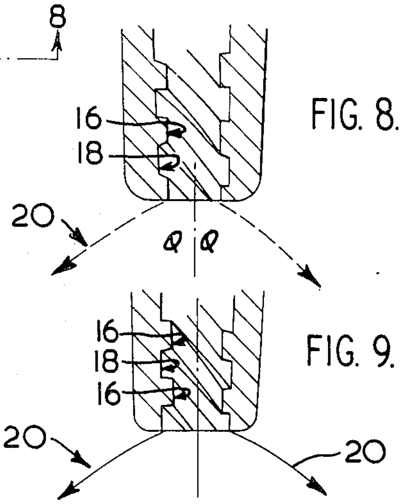
FIG. 8.
FIG. 9.

HYDROCYCLONE SEPARATOR OR CLASSIFIER

The present invention relates to improvements in hydrocyclone separators and to improved hydrocyclone separating processes.

More particularly, the invention relates to improved apparatus and processes for separating suspensions of solid(s) in liquid(s) into its components by means of centrifugal force. The invention finds a unique application in the separation of tar bearing liquids from tar sands but is by no means restricted to this particular application.

The construction and operation of a standard hydrocyclone is quite well known in the art. Basically the hydrocyclone includes a vortex chamber (usually cone shaped) having an "underflow" outlet at one end and an "overflow" outlet at the other end. The infeed to the hydrocyclone is via a tangentially disposed inlet, which infeed sets up a fluid vortex within the chamber. The centrifugal forces created effect a separation between the fractions involved with the heavier constituent(s) or fraction(s) passing out through the underflow with the lighter one(s) passing through the overflow outlet.

It is well known that a standard hydrocyclone solid-liquid separator's function is to efficiently remove suspended solids from a suspending liquid. The ideal cyclone should pass to underflow all sizes of solid particles fed to it. In practice this ideal situation can be approached only as a limit. Many of the factors which tend to reduce efficiency are well known e.g. "short circuit" flow along the hydrocyclone roof and down the outside of the vortex finder. This type of flow is reduced by selecting a hydrocyclone that is long in relation to its diameter. A further limitation arises as a result of the fact that for efficient operation there must be a wet underflow discharge. The characteristic flow pattern at the underflow discharge is an "umbrella" type spray around an air core. If an attempt is made to operate with a drier "rope" discharge at the underflow with no air core present in that region there is a tendency for some of the finer solids to be lost to the overflow; furthermore, instability may result and operating control may, in part, be lost due to the loss of the air core. Several investigators have carried out research in an effort to determine the maximum attainable solids concentration in a standard hydrocyclone. D. A. Dahlstrom in an article written in 1954 suggests that "A value for the maximum attainable solids concentration can be obtained from the approximate volume ratio of 1.48:1 solid to liquid. This corresponds to 80% solids by weight for a 2.7 gm/cm$^3$ particle density and is in good agreement with data for quartz using a 3 inch cyclone and "rope" discharge. The limiting factor for vortex or spray discharge is nearer the volume ratio 1:1 which is equal to a concentration of 73% solids by weight. Typical values of underflow concentrations (not necessarily maximum values) are tabulated by Bradley in "The Hydrocyclone", McGraw Hill, London, (ref. pages 133–136)."

It is an object of the present invention to provide improvements in ways and means of separating suspensions of the nature indicated above and to this end use is made of an apparatus including two vortex chambers arranged such that the underflow of a first or primary vortex chamber feeds through the vortex finder of a secondary vortex chamber. The liquid suspension to be separated is introduced tangentially into the primary vortex chamber in the usual fashion while in the secondary vortex chamber, a feed of "wash water" is also introduced in tangential fashion in the same sense of rotation. The bulk of the liquid portion of the suspension together with any lighter fractions of the solids pass(es) out the overflow of the primary vortex chamber while the heavier solids portion of the suspension together with the wash water pass out through the underflow of the secondary cyclone chamber; in practice, there will always be some mixing of the several components so that the efficiency of the separation will be considerably less than 100%.

Broadly speaking, separating apparatus similar to that described above is shown in British Patent Specification No. 770,860 published Mar. 27, 1957.

In general, the present invention is concerned primarily with two or three constituent suspensions i.e., a solid and liquid system, or a solid and liquid together with a "third constituent" which is a solid or liquid having a specific gravity close to or less than that of the liquid. Some examples of this third constituent are bitumen (specific gravity 1.0 –1.1), aerated bitumen (specific gravity 0.75–0.85) and paper pulp fibre (specific gravity <1.0). It is therefore a primary object of the invention to improve the efficiency of the separation between the solid and the liquid or between the solid and the liquid plus the "third constituent" as the case may be.

The present invention, in one aspect, provides an improved hydrocyclone separating apparatus for separating a suspension of solid(s) in liquid(s). The apparatus includes a primary vortex chamber and means for passing the suspension tangentially into this chamber. A secondary vortex chamber is provided and is arranged such that the underflow of the primary vortex chamber is connected to the overflow of the secondary vortex chamber with suitable wall means defining a fluid flow channel therebetween. The wall means is provided with spiral groove(s) sized so that the heavier solids portion of the suspension may pass therealong as it moves into the secondary vortex chamber. The secondary vortex chamber is provided with a tangential inlet for washing fluid as well as an underflow outlet. By providing the spiral groove means outlined above, major improvements in the operation of the hydrocyclone in many areas may be realized as will be seen hereinafter, among them being the fact that this arrangement reduces interference between the heavier solids fraction moving into the secondary and the opposing overflow stream passing into the first or primary chamber from the secondary chamber as well as reducing the possibility of interference with the air core which, in the desired mode of operation, extends axially throughout the length of the assembly, thus increasing the efficiency of the separation procedure.

A further aspect of the invention concerns the separation of liquids from a suspension of solid in liquid. In accordance with this aspect of the invention the liquid suspension is directed through the tangential inlet of the primary vortex chamber. Due to the centrifugal action of the vortex the heavier solids move to the wall of the primary cyclone chamber and together with some of the liquid spiral towards the underflow region where they enter the spiral grooves and spiral into the overflow region of the secondary cyclone chamber. At the same time the bulk of the liquid portion and the more readily recoverable portion of the third constituent moves towards the axis of the primary cyclone chamber and spirals along and around the air core and is carried outwardly of the overflow of the primary vortex chamber as primary recovery. For secondary recovery wash water is fed tangentially into the secondary chamber and mixes with the solids discharged from the underflow of the primary vortex chamber whereupon the solids again spiral to the wall and move to the underflow of the secondary chamber and are rejected with the wash water. A substantial portion of the liquid together with that portion of any third constituent which has passed with the solids into the secondary vortex chamber is displaced towards the axis of the chamber and spirals around the air core back into the primary vortex chamber and out of the primary overflow outlet and this results in secondary recovery. Since much of the material passing into the secondary vortex chamber moves along the spiral grooves mentioned above there is little interference thereof with either the liquid moving in the opposite direction into the primary vortex chamber or with the axially extending air core so necessary for efficient operation.

The invention, in a further aspect, concerns the recovery of a specific type of third constituent material i.e. tar or bitumen from so-called "tar sands". In the prior art processes the tar bearing sand is fed into a tumbler and agitated with steam and water to aerate the bitumen particles after which the bitumen is separated in a two-stage process i.e. (i) flotation in primary separation and (ii) centrifugal separation of middlings from the primary in centrifuges for secondary removal of fine sands and secondary recovery of bitumen.

High bitumen recovery is not possible by simply using a single stage hydrocyclone as a thickener as previously described. The reason for this is due to the nature of the bitumen. This petroleum tar has extremely high viscosities even at elevated temperatures. When the natural deposit of tar-sand is slurried with hot water and steam in a large vessel most of the bitumen is disassociated from the sand grains, picks up air and is lighter than the water. This portion of the bitumen is recoverable in the primary stage but a certain residual amount of bitumen which, if discarded, would render the recovery operation impractical and uneconomic, clings to the sand grains and is not recovered in the primary. These bitumen particles are deaerated and have a specific gravity of 1.0 to 1.1 and hence go the underflow of the primary stage. It was found by other investigators, (i.e. Syncrude of Canada Ltd.) that primary bitumen recovery relates directly to the recovery of original hot water in the slurry. Thus, a further object of the invention is to maximize recovery of the original liquid fraction by primary and secondary recovery of the suspension and the bitumen carried thereby.

Thus, in accordance with this aspect of the invention, a slurry of hot water and tar sand is directed through the tangential inlet of a primary vortex chamber as described above. The bulk of the liquid portion of the slurry, including the bitumen, is separated out in the primary vortex chamber and passes into the overflow stream as described above. However, by virtue of the additional recovery of the liquid portion of the slurry and the bitumen contained therein provided by the separation in the secondary vortex chamber the process is made economically viable and practical.

The invention will be further described by way of example with reference to the following drawings wherein:

FIG. 1 is a section view taken along the longitudinal axis of a hydrocyclone separator according to the present invention;

FIGS. 2 and 3 are cross-section views taken along lines 2—2 and 3—3 of FIG. 1, FIGS. 2 and 3 being superimposed on one another to show the relative angular orientations of the several parts and the sense of rotation of the slurry;

FIG. 5 is a section view taken along the grooved portion of the primary underflow;

FIG. 6 is a view looking toward the extreme apex end of the primary underflow and illustrating the flow pattern;

FIG. 7 is a fragmentary cross section view of the spiral groove-defining threads;

FIGS. 8 & 9 are fragmentary section views taken along lines 8—8 and 9—9 in FIG. 6 and showing the liquid rich and solid rich streams issuing from the primary underflow;

Figure 4:
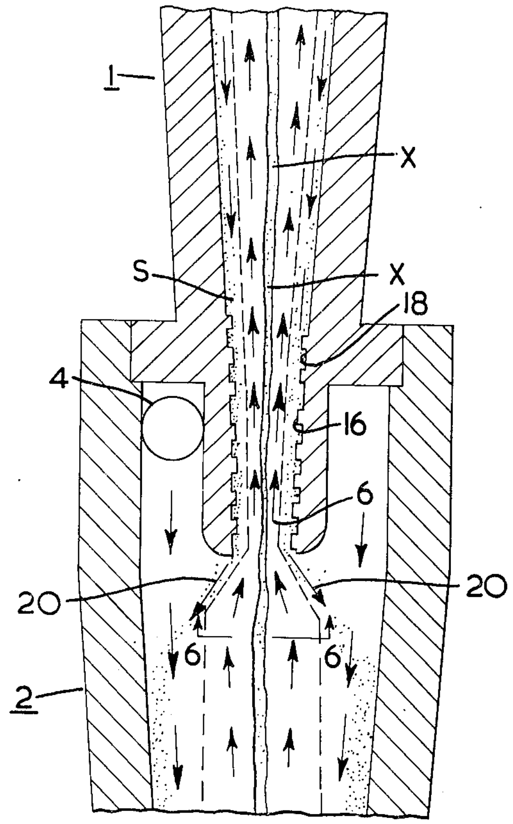
FIG. 4 is a fragmentary section view taken along the longitudinal axis of the separator in the region of the underflow of the primary vortex chamber.

FIG. 1 shows a typical hydrocyclone separator or classifier according to the invention including a pair of axially aligned primary and secondary vortex chambers 1 and 2 respectively which are provided with tangential primary and secondary inlets 3 and 4 respectively. Both vortex chambers are of generally conical configuration with the primary vortex chamber 1 being provided with a central discharge opening, termed the primary overflow 5, and a second discharge opening, the primary underflow 6, adjacent the apex of the cone, the underflow 6 leading into the overflow region 7 of the secondary vortex chamber 2. The secondary vortex chamber 2 also has a secondary underflow 8 at its apex. Both vortex chambers include relatively short cylindrical wall sections in the regions of the tangential inlets.

In order to avoid, as much as possible, interference between the incoming tangentially directed primary feed through inlet 3 and the flow through the overflow 5, the vortex chamber 1 is provided with a vortex finder 10 which extends axially along the vortex chamber for a suitable distance as is well known in the art while, at the same time, the underflow 6 of vortex chamber 1 projects axially along and into the interior of vortex chamber 2 to provide, in effect, a vortex finder of suitable length so as to avoid problems of interference of the axially directed liquid flow in this region with the incoming tangentially directed stream through secondary inlet 4.

As mentioned previously, the apparatus of the invention is specially adapted to separate tar or bitumen bearing liquid from tar sands, although it should be realized that the principles of the invention extend to the separation of other materials as well. However, for purposes of the description contained herein by way of example, the separation of tar bearing liquids from tar-sand will be given primary consideration.

As mentioned above the slurry contains a mixture of bitumen, sand and water. Maximum recovery of the bitumen whilst removing as much sand as possible is required for efficient operation.

In a typical operation according to the invention, the feed to inlet 3 of vortex chamber 1 (the primary stage)

is a hot slurry consisting of water and tar sand having a temperature between 140° and 180°F. with a consistency of some 30–50% solids by weight, having 4–6% by volume of bitumen. This hot slurry enters vortex chamber 1 tangentially through inlet 3 with sufficient velocity to establish a vortex. Due to the centrifugal action of this vortex (often termed the outer vortex), the sand moves to the wall 12 of cyclone chamber 1 and spirals downwardly to the apex or underflow 6 of vortex chamber 1 where it is rejected into the overflow of the vortex chamber 2. The hot tar bearing liquid is displaced toward the central axis of the cone where it spirals upwardly with the overflow stream (often termed the inner vortex), and thence outwardly through the overflow passage 5 of vortex chamber 1. The boundary between the outer vortex and the inner vortex, known as the locus of zero vertical velocity, is shown by dashed lines in FIG. 1. For the cylindrical portion there is no inward radial flow across it — it is termed the "mantle".

There is radial flow across the conical portion of the locus where portions of the outer vortex are progressively turned inward and upward to join the inner vortex as the small end of the core is approached. This conical portion is referred to as the conical classification surface.

The feed through the tangential inlet 4 to the vortex chamber 2 (i.e. the feed to the secondary stage) is cold water having a temperature in the order of 40°–60°F., which water contains no solids. This cold water feed enters vortex chamber 2 in a tangential fashion as shown by arrow 21 thus setting up a vortex with mixing occurring with the sand rejected via the underflow 6 of vortex chamber 1. The sand moves toward the wall 14 of the vortex chamber 2 as a result of the centrifugal action of the vortex and, at the same time, hot tar bearing liquid which passed downwardly through primary underflow 6 is displaced towards the central axis of the hydrocyclone unit and is replaced by the cold wash water entering through inlet 4. The sand together with the cold water then spirals downwardly to and through the underflow 8 of the vortex chamber 2 and is rejected to the tailings. The hot tar bearing liquid spirals upwardly around the axis of the two aligned vortex chambers and passes upwardly through the underflow portion 6 and hence completely along through vortex chamber 1 until it is accepted at the overflow 5. The locus of zero vertical velocity between the outer vortex which carries the sand and the inner vortex of tar bearing liquid in vortex chamber 2 is also shown by dashed lines in FIG. 1 which identifies a mantle and a "conical classification surface". When the separator is functioning properly, the inner vortex extends along the axis of the aligned vortex chamber from the secondary underflow 8 to the primary overflow 5. Furthermore a liquid-free or low pressure area exists around and along the entire axis of the two aligned vortex chambers 1 and 2, which liquid-free or low pressure area is known as an air core (X). The air core is a requirement for a fully established vortex and in the operation of the separator such air core exists from the top of the primary stage vortex chamber 1 to the underflow apex of the secondary vortex chamber 2. This air core is surrounded by the above mentioned inner vortex.

In accordance with a very important feature of the invention, the inside wall of the underflow 6 of vortex chamber 1 is provided with a spiral screw thread like arrangement which extends from the extreme end of the underflow 6 upwardly along the conical wall of the vortex chamber 1 for a suitable distance. The cross section of the spiral thread is clearly shown in FIGS. 4 and 5. These threads are, preferably, of a somewhat square cross section i.e. buttress-like threads, with spiral or helical groove(s) 18 provided therebetween. Thus, as the sand spirals downwardly along the wall 12 of vortex chamber 1, the major portion of such sand can enter such spiral groove(s) 18 between the threads 16 and thus travel around the axis of the hydrocyclones until the end of the underflow passage 6 is reached.

Preferably, the threads 16 are of the double-start variety such that, at any cross section, two passageways for the sand are provided by the grooves 18 as best illustrated in the cross section of FIG. 3. The sand, after travelling downwardly along grooves 18, is ejected together with the liquid accompanying same in a circular fan-type flow into the vortex chamber 2. This flow, designated by arrows 20 in FIGS. 1, 3, 4, 6, 8 and 9, may be described as a wide angle conical-type flow consisting physically and volumetrically for the most part of two symmetrical solid-rich, fan-type streams, (illustrated by the full line arrows in FIGS. 6 and 8) flowing out of the helical grooves 18 of the underflow 6. The fan-type streams are divided by two thin fan-type liquid-rich streams (illustrated by the dashed line arrows in FIG. 6 and 8) having considerably less volume flow than the solid-rich streams and emanating from the two portions of the extreme end of the primary underflow passage 6 located between the two grooves 18. This flow pattern has been observed when the underflow of vortex chamber 1 is open to the air. With the back pressures involved in the actual operation of the double vortex chamber shown it is believed that the flow pattern is similar but that the flow rates are somewhat reduced.

Two reasons why the spiral screw thread-like formations 16 are of major importance are that they help to reduce interference between the oppositely moving flows in the underflow portion 6 of the primary stage vortex chamber 1 as well as help to avoid disruption of the air core X. With reference to FIG. 4, it will be seen that the sand S hugs the wall of the primary vortex chamber 1 and thus as it spirals downwardly it enters the spiral grooves 18 between the threads. Radially inwardly of the downwardly moving sand is the upwardly flowing and rotating stream of hot or warm tar bearing liquid which is displaced upwardly from the secondary stage vortex chamber 2 as described above. In the central portion of the flows is the air core which is designated by the reference numeral X. In the absence of the spiral grooves there would be a concentration of solids nearer the air core at the outlet increasing the possibility of air-core interference or collapse and consequently a tendency towards a considerable degree of mixing of the oppositely moving flows and thus a loss in separating efficiency. Although this tendency cannot be completely eliminated, experience has shown that the reduced degree of interference between the two counter-moving flows permits a considerable increase in efficiency to be achieved and this is made possible by the use of the spiral screw thread-like elements defining the grooves for permitting passage of the sand (as described above). Furthermore, there is less chance of the flow disrupting the air core and hence operating stability and efficiency are further improved.

It is therefore seen from the above that the downward flow of solids, e.g. sand, in the outermost vortex is, while passing along the underflow of the primary vortex chamber 1, in effect, throttled in between the outer boundary of the upwardly spiralling inner vortex e.g., the warm tar bearing water or fluid moving upwardly from the secondary vortex chamber 2 and the side walls and bottoms of the helical grooves 18 in the underflow 6. It is here that the grooves 18 play a vital role. Without these grooves and by holding a back pressure on the underflow sufficiently high as to get a high solids concentration (approximately 80% by weight), rope discharge from the primary underflow would be necessary with the result that the air core would be lost. This would eliminate any chance of obtaining a secondary recovery of bitumen from the regions below the primary underflow 6 i.e., from the secondary vortex chamber.

The orientation of inlets 3 and 4 to the axis and the direction of rotation around the central axis of the helical grooves 18 and 8 in the walls of vortex chambers 1 and 2 respectively, are all in the same sense which means that the rotation of the outer and inner liquid vortices in both vortex chambers and the rotation of any material in the grooves 18 and 8 would all be in the same sense e.g. all in the same direction as arrow 21 in FIG. 1.

The spiral grooves 18 and 8 extend from the extreme ends of the chambers 1 and 2 respectively to points sufficiently far towards the inlet ends so as to start at or near the end of the mantle outside of which all solids must go since there is zero radial velocity in the mantle.

Figure 10:
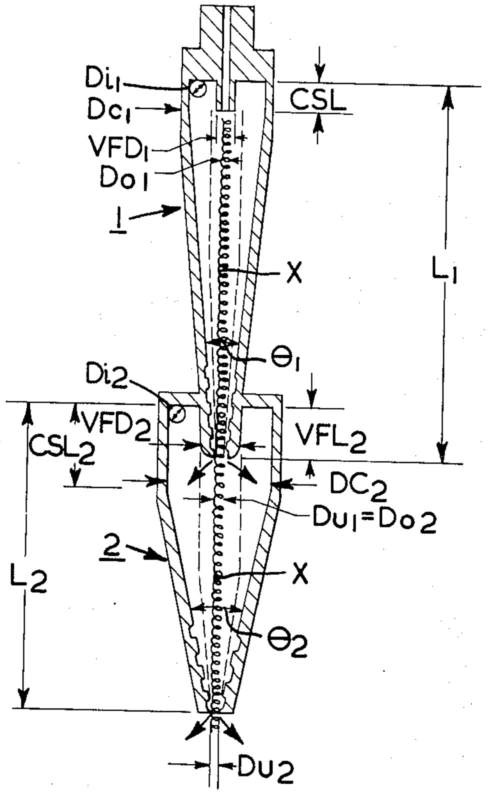
FIG. 10 is a view similar to that of FIG. 1 and bearing symbols which are used in conjunction with Table I to give dimensions for the various parts of a typical separator.

The total length of the threaded sections in the primary and secondary vortex chambers of table I lie in the range of 30 to 40% of the total chamber lengths indicated as $L_1$ and $L_2$ in FIG. 10 for the primary and secondary respectively. This means that the cone inside diameters at the commencement of the threads lie in the range 55% to 70% of the cone diameter, $D_c$ thus being near the theoretical cone diameter corresponding to the end of the mantle (and the commencement of the conical classification surface) which D. Bradley found to be 70% of the cone diameter, $D_c$.

Test results with the separator made in accordance with the present invention showed a net solids concentration in the primary underflow as high as 83.5% by weight while still maintaining the air core. This represents a major improvement over the prior art. The recovery of original liquid i.e. the liquid fed through tangential inlet 3 of the primary vortex chamber 1 was 92.7%–93.2% and the loss of sand through the primary overflow 5 was only 4.85%. From these results a total bitumen recovery of at least 92.7% can be reasonably expected. The temperature of the primary feed through inlet 3 was only 20°–25°F. above the temperature of the wash water. In contrast to the above, in tests using a standard single 3 inch cyclone of the prior art wherein the average recovery of original slurry water was tested at various feed and overflow pressures and feed solids concentrations between 30 and 40% by weight and in the temperature range of 65° – 85°F., the maximum and minimum recoveries of original water were 76.3% and 61.2% respectively. Up to 2% sand by weight was lost to overflow for high water recovery and rope discharge had to be employed.

The separator or classifier (of the present invention) may be termed a hot thickener-cold washer combination. The primary separator as defined by vortex chamber 1 is a thickener (or solid-liquid separator) designed so as to discharge in a controlled manner the solids rich underflow (e.g. sand) into the outer downwardly spiralling vortex in the secondary chamber 2 into which the clean cold water is fed tangentially via inlet 4. At the same time about 70–80% of the total desired bitumen recovery is achieved in the primary thickener. This represents most of the aerated bitumen referred to previously.

The cold wash water is directed through tangential inlet 4 in a specific orientation in relation to the controlled entry into the secondary vortex chamber 2 of the two solids-rich streams from the helical grooves 18 as described below more fully. At the same time the pressure and flow of wash water through inlet 4 are controlled to hold a sufficient back pressure on the underflow passing from the primary stage i.e. vortex chamber 1 while at the same time assisting in holding and developing a stable air core throughout the length of the secondary stage vortex chamber 2.

Some additional comments will now be made regarding the structure and operation of the secondary stage of vortex chamber 2. In order to achieve an efficient recovery in the secondary stage, it is necessary to obtain an efficient washing of the bituminous particles from the sand and also to effect a proper displacement of the hot tar bearing liquid inwardly from the outer vortex toward the inner vortex so that such tar bearing liquid may be carried upwardly with the spiralling inner vortex through and outwardly of the primary underflow 5. In order to carry out the above effectively the unit has been designed for the following:

i. The controlled in-flows of the solids-rich streams 20 from the outlets of the two helical grooves 18 in the primary underflow 6 orifice has sufficient rotational and outward radial momentum as to be hydraulically ejected into the outer vortex of the secondary wash water.

ii. A controlled mixing of these two solids-rich streams 20 with the cold wash water is provided by directing the cold wash water stream through inlet 4 tangentially at a point on the circumference of the primary underflow apex approximately mid-way between the terminal ends of the two grooves 18 as illustrated in FIGS. 2 and 3. This helps the cold wash water to displace the more inwardly located hot water and drive it and the bitumen (that has been washed free of the sand grains) into the inner vortex so that the latter may carry the hot water and bitumen upwardly and out of primary overflow 5.

iii. There is a controlled difference in the temperatures of the primary and secondary feeds. The viscosity of water between 140°–160°F. is approximately one third of water at 40°–60°F. This enables sand that enters the secondary vortex chamber to migrate through the hot water to the outer vortex or conversely hot water to be displaced inwardly toward the inner vortex more readily than the cold water introduced through inelt 4 thus bringing with it the bitumen with which it was originally associated.

iv. The secondary cylindrical section length is chosen to give adequate residence time for recirculation.

v. The cone angle of the secondary cyclone chamber is sufficiently large to increase shear ratio so as to assist washing of sand grains.

It has also been found advisable to provide spiral grooves in the underflow region 8 of the secondary cyclone chamber 2 similar to the ones provided in the primary underflow. These grooves are not essential to the operation of the device but they assist in accommodating an increased flow rate of solids-rich underflow which has undergone considerable dilution by the wash water when compared with the underflow from the primary stage. By way of example the primary underflow may run from 6–9 U.S. gallons per minute net while the secondary underflow runs in the order of 16 U.S. gallons per minute.

There is also an effect known as the short-circuit water effect which the present invention takes advantage of. By feeding the cold wash water into the secondary vortex chamber 2 via the tangential inlet 4 there is necessarily a tendency for a "short circuit" flow of cold water in the vortex chamber along the roof and down the outside of the underflow of the primary vortex chamber 1 (which underflow portion also serves as the vortex finder for the secondary stage vortex chamber 2). This short circuit flow tends to follow the line of least resistance so as to enter the inner upwardly moving vortex around the lower end of the underflow 6 (vortex finder) at those points on its circumference where the downward flow of heavy solids from the primary vortex chamber 1 is minimal i.e. where there are no grooves. Thus, the short circuit flow will, in effect, exert a certain amount of back pressure on the original hot water-rich downward flow causing some of it to reverse its spiral and to move radially inwards and be advantageously caught in the inner vortex and carried upwardly therewith and out of the primary overflow 5.

The design of the separator of the present invention has been described in general terms. It now seems desirable to make reference to a specific design of hydrocyclone and to outline the results of tests carried out thereon. Those skilled in the art will appreciate that many different sizes and dimensions of hydrocyclones may be used while still retaining the spirit of the present invention and thus the scope of the invention is not to be limited by the specific examples given hereinafter.

The following table should be read in conjunction with FIGS. 7 and 10 and serves to outline dimensions of the various components of a typical test unit.

TABLE I

| Symbols Used | | | Dimensions (inches) Primary (1) | Secondary (2) |
|---|---|---|---|---|
| L | = | Vortex chamber length | 28.1 | 19.2 |
| $D_c$ | = | Maximum body inside diameter | 3.1 | 4.1 |
| $D_i$ | = | Inlet diameter | .75 | .5 |
| $D_o$ | = | Overflow diameter | .61 | 1.25 |
| $D_u$ | = | Underflow diameter | 1.25 | .38 |
| VFD | = | Vortex finder outer diameter (at lower end) | 1.23 | 2.6 |
| CSL | = | Cylindrical section length | 0 | 4.6 |
| VFL | = | Vortex finder length | 2.1 | 3.5 |
| Θ | = | Included cone angle, degrees | 3°4′ | 12°32′ |
| E | = | Thread dimension (see Fig. 7) | .085 | .130 |
| F | = | Thread dimension | .200 | .295 |
| G | = | Thread dimension | .244 | .245 |
| H | = | Thread dimension | .490 | .620 |
| J | = | Total length of threaded portion of underflow | 10 | 7.1 |

With reference to the above Table and to the drawings i.e., FIGS. 1, 2 and 3 it will be noted that in the present design of the separator the differences in dimensions of the various components of the primary separator and the secondary separator are as follows:

TABLE II

| Primary Vs Secondary: | Comments |
|---|---|
| $L_1 > L_2$ | Low shear in 1, high shear in 2 |
| $Dc_1 < Dc_2$ | Low shear in 1, high shear in 2 |
| $Du_1 >> Du_2$ | |
| $Do_1 > Du_2$ | |
| $Di_1 > Di_2$ | |
| $\theta_1 < \theta 2$ | |
| $CSL_1 < CSL_2$ | |
| $VFL_1 < VFL_2$ | |
| $VFD_1 < VFD_2$ | |
| Note: Larger helical grooves in underflow of secondary than primary | |
| In Primary | |
| $Di_1 > Do_1$ | (Having inlet > overflow appears to be very uncommon in present designs) |
| $Du_1 >> Do_1$ | |
| $Du_1 > Di_1$ | |

The following table serves to outline the results of tests carried out on the separator dimensioned as set out above in Table I.

TABLE III

| Test no | | 1 | 2 | 3 | 4 | 5 | 6* | Note | |
|---|---|---|---|---|---|---|---|---|---|
| $Q_{fl}$ | (a) | 30.3 | 33.1 | 30.12 | 32.86 | 33.23 | 37.12 | C | For All Tests |
| | (b) | 30.0 | 33.0 | 32.55 | 32.58 | 33.84 | 38.7 | C | |
| $Q_{a1}$ | | 23.4 | 23.65 | 23.4 | 23.2 | 23.9 | 22.45 | M | Average |
| $Q_{r2}$ | (a) | 16.13 | 18.45 | 16.52 | 18.23 | 17.19 | 16.67 | M | Temperatures |
| | (b) | 15.83 | 18.30 | 18.75 | 17.95 | 18.75 | 16.25 | M | |
| $Q_w$ | | 9.23 | 9.00 | 9.60 | 8.57 | 8.77 | 0 | M | Primary |
| $P_f$ | | 18.5 | 18.5 | 18.0 | 18.5 | 18.5 | 18.5 | M | Feed: 75°F |
| $P_a$ | | 6 | 5.5 | 5.5 | 5.5 | 5.5 | 5.0 | M | |
| $P_w$ | | 12.5 | 13.0 | ? | 13.5 | 14.0 | 12.5 | M | Water |
| $\eta$ | (a) | 93.2 | 84.2 | 90.8 | 86.0 | 86.7 | 73.3 | C | |
| | (b) | 92.7 | 84.5 | 83.6 | 88.0 | 87.2 | 74.0 | C | To |
| | (a) | 33.0 | 29.8 | 32.2 | 34.35 | 33.57 | 40.1 | C | |
| $C_{fl}$ | (b) | 31.2 | 29.8 | 30.5 | 37.15 | 36.1 | 39.65 | C | Secondary: 50°F |
| $C_{a1}$ | | 4.85 | 0 | −4.09 | 8.48 | 9.22 | 5.08 | M | |
| $C_{r1}$ | (a) | 83.5 | 72.7 | 82.3 | 72.2 | 76.2 | 69.1 | | |
| | (b) | 81.6 | 73.1 | 71.1 | 76.2 | 74.5 | 69.2 | C | |

Notes: 1. (a), (b) represent two consecutive

TABLE III-continued

2. M=measured C=calculated flow rates taken for each test.

*Note: Compare test 6 with no wash water to tests 1–5.

$Q_{f1}$ = Feed Flow Rate U.S.G.P.M. (U.S gals/minute) to primary
$Q_{a1}$ = Overflow (or accept) U.S.G.P.M. (U.S. gals/minute) from primary
$Q_{r2}$ = Underflow (or reject) U.S.G.P.M. (U.S. gals/minute) from secondary
$Q_w$ = Wash water Flow Rate U.S.G.P.M. (U.S. gals/minute) to secondary
$P_f$ = Feed line pressure, psig
$P_a$ = Accept line pressure, psig
$P_w$ = Wash water pressure, psig
Recorded at pressure tap opposite water entry inside the secondary cyclone.

$$\eta = \frac{\text{Feed liquid accepted}}{\text{Feed liquid}} \times 100 \quad \% = \text{Recovery of original slurry water}$$

$C_{f1}$ = % Solids consistency by weight of Feed slurry to Primary
$C_{a1}$ = % Solids consistency by weight of Overflow (or accept) from primary
$C_{r1}$ = Net solids consistency by weight of Underflow (or reject) from primary

I claim:

1. A method for the fractionation of the constituents of a liquid suspension, comprising the following steps: introducing the suspension tangentially into a primary vortex chamber having overflow and underflow outlets with a substantial separation of the constituents being effected within said chamber with a portion of the liquid and a major portion of the lighter constituents passing out of the primary overflow outlet and the remainder of the liquid together with heavier constituents and a minor portion of lighter constituents passing out of the underflow of the primary vortex chamber and into the overflow region of a secondary vortex chamber; introducing a washing fluid tangentially into the secondary vortex chamber, at least a portion of said washing fluid and the heavier constituents proceeding out of the underflow of the secondary vortex chamber and at least a portion of the liquid together with lighter constituents which have entered the secondary vortex chamber moving towards the axis of the secondary vortex chamber by virtue of the action of the vortex in the secondary vortex chamber and moving along and around said axis and out of the overflow region of the latter and thence along the axis of the primary vortex chamber together with said portion of said liquid and said major portion of the lighter constituents separated out in the primary vortex chamber and thence moving together out of the overflow of the latter; and passing at least a portion of the heavier constituents within groove means towards said secondary vortex chamber, said groove means being provided in a wall of the underflow outlet of the primary vortex chamber helically around the axis thereof and extending to the terminal end of the primary underflow for reducing interference between said liquid and heavier constituents passing through the underflow of the primary vortex chamber into the secondary vortex chamber and the oppositely moving liquid and lighter constituents passing from said secondary chamber into said primary vortex chamber.

2. A method according to claim 1 wherein the temperature of said liquid suspension is substantially higher than that of the washing fluid.

3. A method according to claim 1 wherein said suspension comprises a slurry of relatively hot water, bitumen and sand, and said washing fluid comprises relatively cool water.

4. The method according to claim 3 wherein the groove means comprise a pair of grooves which spiral in the same direction and which terminate at the end of the underflow outlet of the primary chamber, with the heavier portions of the suspension being emitted therefrom in the form of a pair of angularly spaced apart outwardly flaring solids-rich streams which are ejected into the vortex in the secondary chamber, further comprising the step of introducing cool washing liquid tangentially toward a zone of the primary underflow outlet, said zone being intermediate the the terminal ends of said pair of grooves for displacing, by the wash water, the more inwardly located hot water and the bitumen that has been washed free of the sand toward the axis of the second vortex chamber and for simultaneously avoiding interference, by the wash water, with said solids-rich streams.

5. The method according to claim 1 wherein the primary and secondary vortex chambers are axially aligned and wherein, during operation, an air core extends along the aligned axes of said chambers.

6. Apparatus for separating or fractionating suspensions of a solid in a liquid, comprising in combination: a primary vortex chamber for effecting a primary separation of the suspension and having an overflow outlet, an underflow outlet and means for passing the liquid suspension tangentially into said chamber; said outlet of the primary vortex chamber having an interior wall; a secondary vortex chamber for effecting a secondary separation of suspension passing thereinto having an overflow region and an underflow outlet, said chambers being arranged such that the underflow outlet of the primary vortex chamber is connected to and passes into the overflow region of the secondary vortex chamber and the respective overflow regions and underflow outlets being in axial alignment; two spiral grooves in the shape of threads of a two-start screw provided in said interior wall of the primary underflow outlet, each groove terminating at the end of the primary underflow outlet, said spiral grooves being sized and arranged so that heavier portions of the suspension moving outwardly of the primary vortex chamber may pass within and along said spiral grooves into the secondary vortex chamber whereby to reduce interference between said heavier portions of the suspension moving into the secondary vortex chamber and an oppositely directed flow of liquid and lighter fractions of the suspension passing from the overflow region of the secondary vortex chamber into the primary vortex chamber and joining the primary overflow, said underflow outlet of the primary vortex chamber extending into the secondary vortex chamber and defining a vortex finder for the secondary vortex chamber; said secondary vortex chamber further having a tangential inlet for washing liquid, said tangential inlet of said secondary vortex chamber being arranged to direct the washing liquid tangentially towards a zone of the primary underflow outlet; said zone being intermediate the groove ends for intercepting and urging radially inwardly, by the washing liquid, said flow of liquid and lighter fractions leaving said primary underflow outlet and simultaneously, for avoiding interference between the washing liquid and the flow containing said heavier portions leaving said primary underflow outlet through said spiral grooves.

7. Apparatus according to claim 6 wherein the underflow outlet of said secondary chamber is also provided with spiral groove means to assist in the passage therethrough of the secondary underflow material.

* * * * *